United States Patent
Lottridge et al.

[15] 3,648,807
[45] Mar. 14, 1972

[54] SLIDING CALIPER DISC BRAKE AND GUIDE AND RETENTION MEANS THEREFOR

[72] Inventors: Neil M. Lottridge; Marc F. Momsen, both of Saginaw, Mich.

[73] Assignee: General Motors Corporation, Detroit, Mich.

[22] Filed: Dec. 18, 1969

[21] Appl. No.: 886,172

[52] U.S. Cl. ........................................... 188/73.3, 188/73.5
[51] Int. Cl. ...................................................... F16d 65/02
[58] Field of Search ..................... 188/71.1, 72.1, 72.4, 73.3, 188/73.4, 73.5, 73.6, 205.3

[56] References Cited

UNITED STATES PATENTS

| 3,265,160 | 8/1966 | Elberg et al | 188/73.6 |
| 3,368,647 | 2/1968 | Laverdant | 188/73.3 |
| 3,422,935 | 1/1969 | Van House | 188/73.3 |
| 3,480,116 | 11/1969 | Rath | 188/73.3 |

Primary Examiner—George E. A. Halvosa
Attorney—W. E. Finken and D. D. McGraw

[57] ABSTRACT

A sliding caliper disc brake in which a stationary carrier and a caliper housing have registering grooves formed in their torque-carrying abutment faces. Guide and retention means received in the grooves act as retention keys which permit sliding movement of the caliper housing relative to the carrier member and the guide and retention means. The caliper housing and the carrier member provide for guiding and retention of the brake pad assemblies in the caliper housing for sliding movement. Each guide and retention means includes a hard, resilient, low-friction plastic or plastic coated rod member and a keeper for holding the rod member in place. The guide and retention means is sufficiently resilient to permit the brake torque to be transmitted through the abutment faces while preventing radial movement of the caliper housing and undamped torque transfer.

9 Claims, 7 Drawing Figures

PATENTED MAR 14 1972

INVENTORS.
Neil M. Lottridge &
BY Marc F. Momsen

D. D. McGraw
ATTORNEY

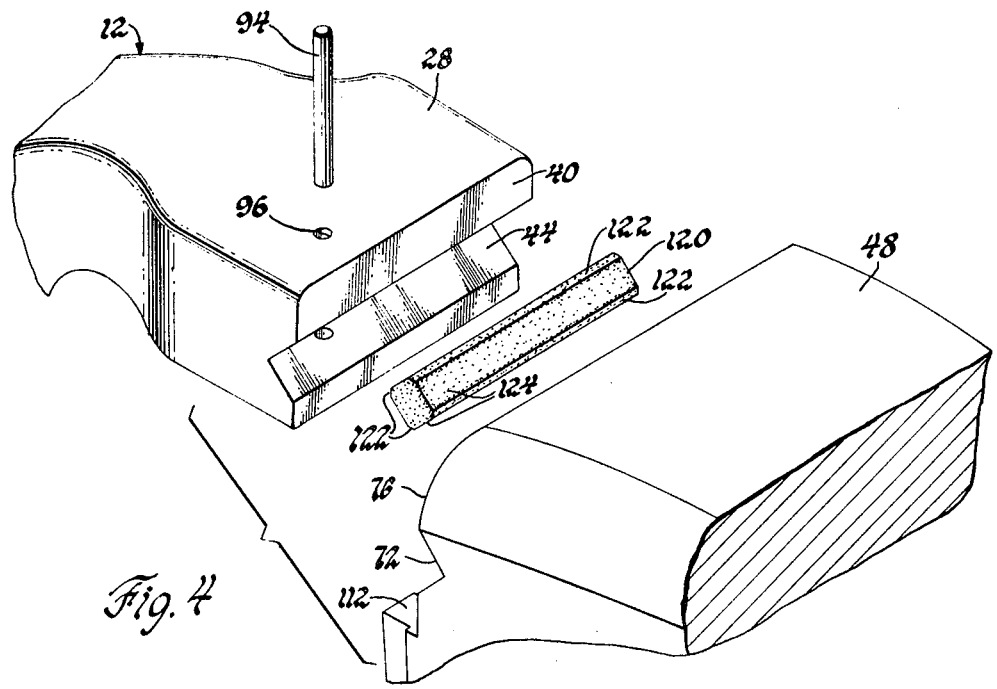
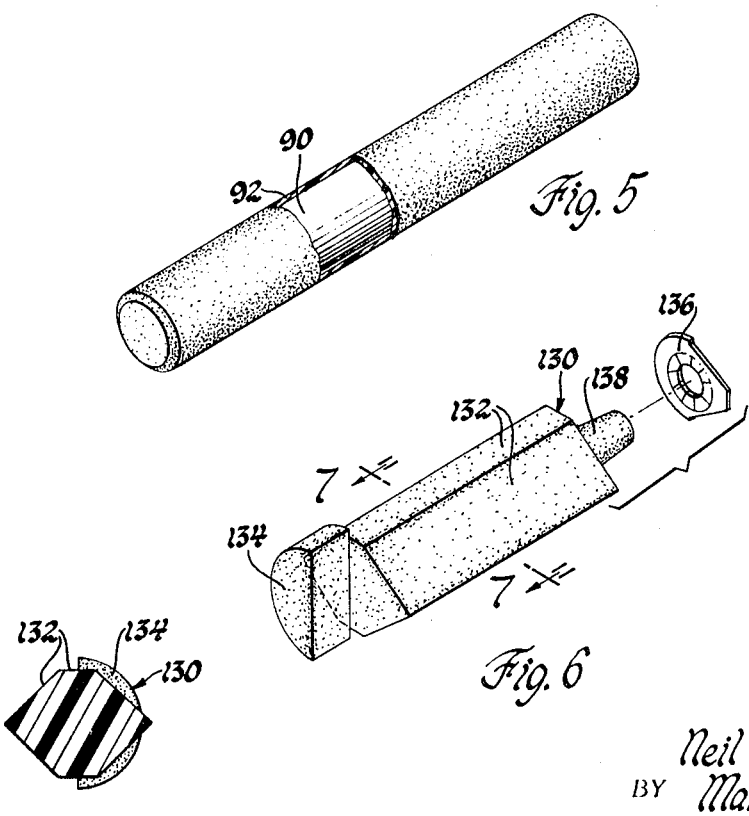

14 # SLIDING CALIPER DISC BRAKE AND GUIDE AND RETENTION MEANS THEREFOR

SPECIFICATION

The invention relates to a disc brake assembly having a sliding caliper mounted in a stationary support bracket and guide and retention means arranged so that the caliper housing is relatively slidable in relation to the support bracket. It more particularly relates to such an assembly in which the brake pad assemblies are mounted so as to be guided in and retained by the caliper housing and the support bracket and are held in position by the relationship of the rotor to the support bracket and the caliper housing when the brake is assembled. The invention further relates to specific guide and retention means constructions.

IN THE DRAWINGS

FIG. 4 is an exploded isometric view of a portion of a disc brake assembly similar to that of FIG. 1, showing a slightly modified guide and retention means in detail and indicating the manner of installation, parts being broken away.

FIG. 5 shows a modification of the guide and retention means used in the disc brake assemblies of FIGS. 1–4.

FIG. 6 shows another modification of the guide and retention means.

FIG. 7 is a cross section view of the device of FIG. 6, taken in the direction of arrows 7—7 of that figure.

Figures 1, 2, 3:
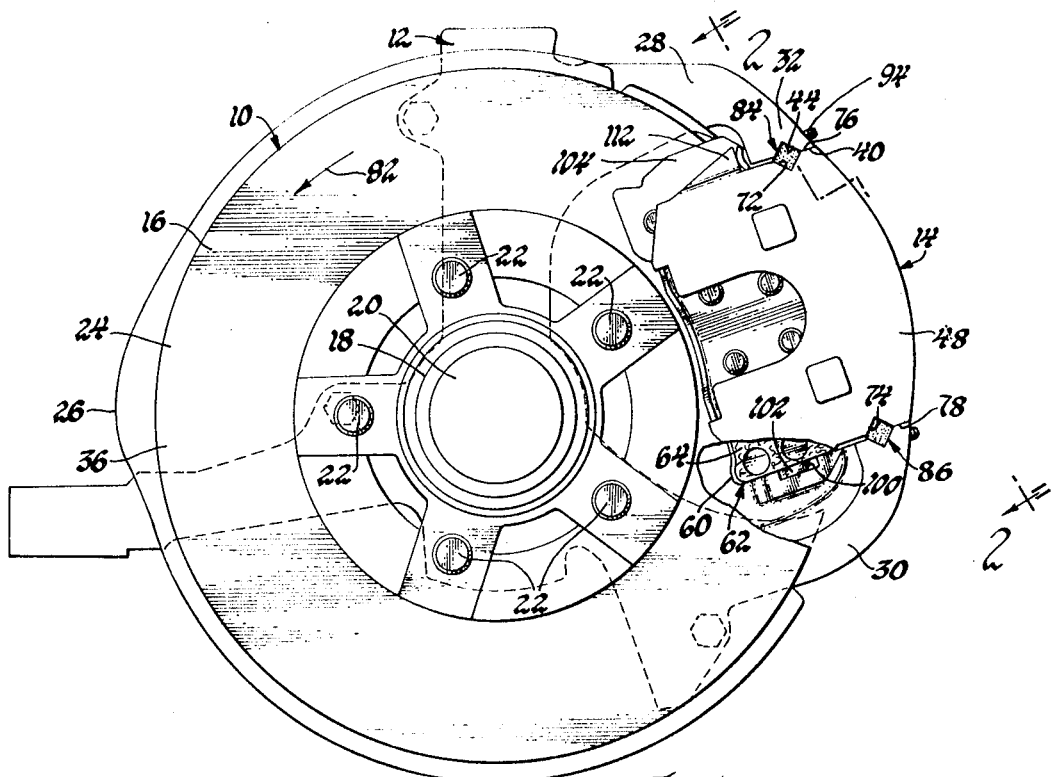
FIG. 1 is a side elevation of a vehicle front disc brake assembly embodying the invention.
FIG. 2 is a view, with parts broken away and in section, of the disc brake assembly of FIG. 1, taken in the direction of arrows 2—2 of that Figure.
FIG. 3 is a fragmentary cross section view of a portion of the disc brake assembly of FIG. 1, with parts broken away, taken in the direction of arrows 3—3 of FIG. 2.

The invention disclosed and claimed herein relates to the inventions disclosed and claimed in the copending applications filed on even date herewith, respectively titled "Sliding Caliper Disc Brake And Guide And Retention Means Therefor," Ser. No. 886,217 filed in the name of Frank W. Brooks; and "Sliding Caliper Disc Brake And Guide And Retention Means Therefor Having Resilient Bushings," Ser. No. 886,084 filed in the name of Richard L. Collins.

The disc brake assembly 10 illustrated in FIG. 1 includes an integral steering knuckle and mounting bracket 12 which provides a stationary carrier member or support frame for the caliper assembly 14. The caliper assembly is formed as a clamping member straddling a portion of the brake disc or rotor 16 and mounted for sliding movement in directions substantially parallel to the axis of rotation of the rotor 16. Since the particular brake assembly illustrated is provided for a vehicle front wheel, the steering knuckle provided is a part of the stationary carrier member 12. However, the brake assembly may be utilized on wheels other than steering wheels and, therefore, the carrier member in such installations would not include the steering knuckle. Also, as is well known in the art, the mounting bracket may be formed separately and attached to a stationary part providing a support frame. As seen in FIG. 1, the rotor 16 has a hub section 18 through which a suitable stub axle formed as a part of the steering knuckle portion of the carrier member 12 is received to rotatably mount the rotor. Since the view is from the outer side in relation to the vehicle, only the bearing cap 20, which covers the stub axle and bearing arrangement, is shown. Suitable wheel mounting studs 22 are provided on the portion of the rotor assembly intermediate the rotor braking surface annulus 24 and the hub section 18. A suitable shield 26 is also illustrated as being attached to the support frame 12.

The support member 12 has a pair of arms 28 and 30 which extend outwardly alongside the rotor 16, and immediately beyond the rotor periphery extend partially over the rotor periphery. As is better seen in FIG. 2, the arms are generally similar in arrangement. Therefore, arm 28 will be described in further detail, with arm 30 being similarly constructed. Near its outer end, arm 28 is formed with an axially extending wide end 32. It should be noted that when axial directions are referred to herein and not otherwise set forth, the reference is being made in terms of the rotational axis of the rotor 16, or other axis lines which are substantially parallel to this axis. Similarly, transverse directions not otherwise set forth relate to directions substantially perpendicular to the opposed friction braking surfaces 36 and 38 of the rotor annulus section 24. These surfaces are parallel to the plane of rotation of the rotor and define the axial limits of two such planes. In accordance with common practice, any plane between and including these surfaces and parallel to the plane of rotation of the rotor is referred to as the plane of the rotor.

A part of arm end 32 is preferably positioned intermediate the planes in which the surfaces 36 and 38 are positioned so that major portions of the braking forces are transmitted to the support frame 12 in line with the rotor 16. Arm end 32 may also extend axially beyond either or both of the planes of surfaces 36 and 38. The extreme end of the arm end 32 is provided with abutment surface 40. This surface or face appears as a line in FIGS. 1 and 3. The arm end 28 is also provided with groove 44 which defines groove means formed in the carrier member. This groove extends transversely and is open through the abutment face 40. Groove 44 extends transversely of the rotor 16 and therefore substantially parallel to the axis of the rotor.

The clamping member or caliper assembly 14 includes the caliper frame or housing 48. The housing is illustrated as being of the single piston type in which a cylinder 50 is formed in one side of the housing, and a brake actuating piston 52 is mounted in the cylinder 50 to form therewith a pressure chamber 54 and for hydraulic brake actuation. A suitable pressure fitting 55 is provided to connect chamber 54 with the remainder of the brake hydraulic system. The piston is provided with suitable seal means 56 and boot 58. The other end of piston 52 from pressure chamber 54 engages the backing plate 60 of the brake pad assembly 62 so that the brake lining 64 is forced into engagement with the friction braking surface 38 of the rotor 16. Reaction to the direct application of the pad assembly 62 to one face of the rotor and increased hydraulic pressure in chamber 54 effects axial movement of the clamping member 14 in the opposite direction so that the portion of the caliper frame on the other side of the rotor 16 applies the other brake pad assembly 66 to the other friction braking surface 36 of the rotor. Brake pad assembly 66 is also constructed to include a backing plate 68 and brake lining 70. Other piston arrangements may be provided as a part of the caliper assembly 14 without departing from the invention. For example, more than one piston and cylinder arrangement may be provided on one side of the rotor, or different piston and cylinder arrangements on both sides of the rotor may be provided.

The caliper frame or housing 48 is provided with grooves 72 and 74 at its circumferentially spaced ends, these grooves being respectively formed through the abutment faces 76 and 78 formed on each circumferentially spaced end thereof. The abutment faces are similar in configuration and, therefore, the circumferentially spaced end in which groove 72 is formed will be described in further detail. This is the end of the caliper frame cooperating with completely described arm 28 of the carrier member.

As shown in greater detail in FIG. 3, groove 72 divides the abutment face 76 into radially inner and outer portions. In the assembly of FIGS. 1–3, in which the guide and retention means to be described includes a rod member which fills up the grooves 44 and 72, the inner portion of abutment face 76 may be set in slightly from the outer portion to permit slight flow of the rod member as necessary. When any of the modified guide and retention means of FIGS. 4–7 are used, the inner and outer portions of abutment face 76 may be in planar alignment, as are the inner and outer portions of abutment face 40. Since the groove 72 also registers with the aligned groove 44 of arm end 32, the inner and outer portions of the abutment face 76 mate with similar portions of abutment faces 40. These faces are in abutting engagement along a line as seen in FIGS. 1 and 3, this line illustrating a plane referred to as the abutment interface 80. The brake force generated when the brake is actuated is transmitted from the brake pad assembly 66 to the caliper frame 48 and, through the abutment means defining the abutment interface 80, to the arm end 32, and, therefore, to the stationary carrier member 12. The brake force from brake pad assembly 62 is transmitted directly to arm 28. This occurs when the disc is rotating in the direction of arrow 82 as seen in FIGS. 1 and 2. When the disc is rotating in the opposite direction, the caliper frame abutment face 78 transmits the braking force from shoe assembly 66 to the abutment face similarly formed on arm 30. Shoe assembly 62 transmits its braking force directly to arm 30.

The guide and retention means 84 and 86 guide and retain the caliper assembly in relation to the stationary carrier member 12. Each guide and retention means is preferably formed as a rod member and has means for holding it in position. Assembly 84 will therefore be described in greater detail, it being understood that assembly 86 is similarly constructed and utilized.

As is seen in cross section in FIGS. 2 and 3, the grooves 44 and 72 are each formed triangularly to provide half of a square or diamond when they are in registry. Assembly 84 includes a rod member 88 having a mating cross section configuration and occupies the space defined between the grooves with a sufficiently tight fit to prevent any appreciable radially inward or outward movement of the caliper housing relative to the support bracket, and to absorb radial shock loads. The slight space provided between the inner portions of abutment faces 40 and 76 permit flow or expansion of the rod member so that manufacturing tolerances are allowed for and full resilient action from the rod member may be realized. This is desirable when the rod member is shaped to fill up the grooves 44 and 72.

The rod member 88 is preferably made of a suitable polyamide resin such as nylon. Other resins having desirable heat, wear, friction, and forming characteristics may also be used. In some instances the rod member may have a metallic base and be coated with a suitable material such as nylon or a high molecular weight fluorocarbon resin such as tetrafluoroethylene, known as Teflon. This modified construction is illustrated in FIG. 5. In that embodiment the pin member 90 is coated with a resilient plastic coating 92 such as Teflon. When the entire rod member is formed of one piece, it is preferable to use nylon as the suitable resilient plastic material. Rod member 88 may have a square or diamond-shaped or generally cylindrical configuration. However, in the broadest aspects of the invention other configurations could be utilized.

The manner of retention of rod 88 relative to the stationary frame 12 involves the use of a pin 94 which fits in an aperture 96 formed in arm 28 and transversely intersecting a part of groove 44. Rod 88 is provided with a transverse aperture or slot 98 through which pin 94 also extends to hold the rod against axial movement. To remove the caliper housing, pins 94 of guide and retention means 84 and 86 are withdrawn and the rods are removed axially. The caliper housing can then be removed radially outward.

The inner brake shoe assembly 62 is guided and retained relative to the caliper housing 48 and the support frame 12 by means of a transverse slot cut in each arm 28 and 30, slot 100 of arm 30 being shown in FIG. 1. The backing plate 60 has guide and retention tangs 102 formed on each end and extending generally circumferentially, each tang 102 slides in a slot 100 to retain and guide shoe assembly 62. The abutting ends of the backing plate abut the inner portions of abutment faces 40 to transmit braking forces directly to the carrier member 12. When the caliper housing 48 is removed, shoe assembly 62 may be readily replaced by removing it in a direction transverse to the rotor 16.

Shoe assembly 66 has hooklike ends 104 and 106 formed as a part of backing plate 68, and tabs 108 and 110 are bent over so that they engage the inner portions of the abutting faces 76 and 78 of caliper housing 48 and also fit over the retaining buttresses 112 and 114 integrally formed on housing 48. Brake forces are transmitted to the caliper housing 48 through either ends 104 and 106, depending on direction of rotation of the rotor 16, and through abutment interface 80 to the stationary member 12. Shoe assembly 66 is readily removed and replaced in housing 48 when the housing is removed from the rotor and support frame. Thus the various guide and retention means for the caliper housing 48 and the brake shoe assemblies include rods 88, pins 94, slots 100, tangs 102, backing plate ends 104 and 106 with tabs 108 and 110, and retaining buttresses 112 and 114.

FIG. 4 shows the manner of assembling the clamping member guide and retention means, and also shows a modified rod member 120. The rod is octagonally formed, with the effect of having the corners of rod 88 being removed to provide four small axially extending flat surfaces 122 circumferentially joining the four major side surfaces 124. Rod 120 thus permits any necessary rod flow and the outer and inner portions of abutment faces 40 and 76 may be in abutting relation along interface 80.

FIGS. 6 and 7 show another modification of the clamping member guide and retention means. The rod or pin 130 is generally diamond shaped in cross section with the radially inner and outer corners being flattened to provide small axially extending flat surfaces 132. One end has a head 134 which is substantially semi-circular and arranged to engage one side of arm 28 while being clear of caliper housing 48 as the housing slides transversely of rotor 16. The head limits axial movement of pin 130 in one direction. A retainer 136 is fitted on the reduced other end 138 of pin 130 and similarly extends so that it prevents axial removal of the pin by engaging the other side of arm 28 while clearing housing 48. This arrangement provides for limited relative sliding movement between the arm 28 and the pin 130 as well as for sliding movement of the caliper housing.

It is to be understood that when the invention is described and defined as having the brake forces transmitted independently of the guide and retention means, or directly and bypassing the guide and retention means, or independently of the resilient supporting means, this does not preclude the exertion of relatively slight forces which will cause some very small deformation of the resilient part or parts of the guide and retention means until full brake force abutting engagement of the affected is obtained. The guide and retention means are not provided for nor intended to be brake force transmitting means which carry any appreciable or substantial amount of the brake load. Insofar as the transmittal of the brake load is concerned per se, the guide and retention means are not required, utilized or expected to so act. This principle likewise applies when the invention is described and defined as preventing or substantially preventing radial movement of the clamping member relative to the carrier member.

What is claimed is:

1. A disc brake comprising:
   a rotor to be braked;
   a fixed support member;
   a caliper assembly having a housing member with piston means therein operatively related to an inner brake pad assembly and an outer brake pad assembly for braking said rotor; and
   caliper assembly supporting and guiding and retaining means including
   a pair of arms on said fixed support member circumferentially spaced with respect to said rotor, each arm having a portion in the plane of said rotor,
   said caliper housing member and said fixed support member and said brake pad assemblies having brake force transmitting abutment face means in a plane at each arm portion parallel to the rotor axis, registering grooves formed in said member abutment face means and extending transversely of the plane of said rotor, said member abutment face means in which said registering grooves are formed being in brake force transmitting abutting relation immediately adjacent to said grooves, and circumferentially spaced caliper housing member guide and retention means received in said registering grooves in sliding key relation to said caliper housing member and said fixed support member, at least one of said brake pad assemblies having its abutment face means engaging said caliper housing member abutment face means in brake force transmitting relation for transmitting brake force directly therebetween and thence directly between said member abutment face means and bypassing said guide and retention means.

2. The disc brake of claim 1, said abutment face means of one of said brake pad assemblies engaging said caliper housing member abutment face means in brake force transmitting relation, and said abutment face means of the other of said brake pad assemblies engaging said fixed support member abutment face means in brake force transmitting relation, whereby brake force from said one brake pad assembly is transmitted directly therefrom to said caliper housing member and directly therefrom to said fixed support member and bypassing said guide and retention means, and brake force from said other brake pad assembly is transmitted directly therefrom to said fixed support member, said abutment face means of said members and said brake pad assemblies including guide means permitting transverse movements of said brake pad assemblies relative to said rotor.

3. The disc brake of claim 1, said guide and retention means comprising:

rods having outside axially extending surfaces mating in sliding relation with complementary surfaces formed by said registering grooves, said rods each having a movement relation limited to relative sliding relation to at least one of said members in and only in directions transverse to the plane of said rotor, said rods having at least said outside axially extending surfaces formed of material selected from a group consisting of polyamide resins, high molecular weight fluorocarbon resins, and acetal resins derived by polymerization of formaldehyde.

4. A disc brake assembly comprising:

a brake rotor, a stationary carrier member having said rotor rotatably mounted relative thereto, a clamping member straddling a portion of the periphery of said rotor and slidably mounted on said carrier member, a pair of brake pad members on opposite sides of said rotor and in said clamping member, means for directly applying one of said pad members to one face of said rotor and by reaction effecting axial movement of said clamping member in the opposite direction to apply the other pad member to the other face of said rotor, first abutment means on said carrier member and second abutment means on said clamping member in abutting alignment with said first abutment means in a plane parallel to the brake rotor axis for limiting circumferential movement of said clamping member with respect to said carrier member, said first abutment means and said second abutment means having axially extending registering groove means therein, third abutment means on said brake pad members in said plane parallel to the brake rotor axis, at least the third abutment means of one of said brake pad members being in abutting alignment with at least said second abutment means, for transmitting brake force to said members abutted by said third abutment means, brake pad member guiding and retention means on said members abutted by said third abutment means guiding at least one of said brake pad members in sliding movement in directions transverse to the plane of said rotor, and guiding and retention means for said clamping member, said clamping member guiding and retention means being slidably mounted in said registering groove means so that axial relative movement is permitted between said clamping member guiding and retention means and at least one of said members.

5. The disc brake assembly of claim 4, said brake pad member guiding and retention means being independent of said clamping member guiding and retention means.

6. The disc brake assembly of claim 4, said third abutment means on one of said brake pad members being in brake force transmitting abutting alignment with said first abutment means, and said third abutment means on the other of said brake pad members being in brake force transmitting abutting alignment with said second abutment means.

7. The disc brake assembly of claim 4, said clamping member guiding and retention means comprising rod means having the surfaces thereof in sliding relation with complementary surfaces of said registering groove means formed of a resilient plastic material providing an anti-rattle mounting for said clamping member on said stationary carrier member, said first and second abutment means transmitting brake torque therebetween directly therebetween bypassing said rod means.

8. The disc brake assembly of claim 4, said clamping member guiding and retention means comprising a pin having a head thereon of substantially semicircular configuration and in axial alignment for engagement with only one of said members adjacent one end of the groove means therein receiving said pin, said head limiting axial movement of said pin in one axial direction relative to said only one member, and retaining means on the end of said pin opposite said head and axially aligned for engagement with said only one member adjacent the other end of the groove means therein receiving said pin, said retaining means limiting axial movement of said pin in the other axial direction relative to said only one member.

9. The disc brake assembly of claim 4, said clamping member guiding and retention means comprising a metal rod having a resilient plastic material coating on the surfaces thereof engaging said groove means.

* * * * *